US012196379B2

(12) United States Patent
Thurner

(10) Patent No.: US 12,196,379 B2
(45) Date of Patent: Jan. 14, 2025

(54) SYSTEM OF INTERCONNECTABLE PORTABLE LIGHTING DEVICES

(71) Applicant: MILWAUKEE ELECTRIC TOOL CORPORATION, Brookfield, WI (US)

(72) Inventor: Jason D. Thurner, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/771,632

(22) PCT Filed: Oct. 30, 2020

(86) PCT No.: PCT/US2020/058174
§ 371 (c)(1),
(2) Date: Apr. 25, 2022

(87) PCT Pub. No.: WO2021/087235
PCT Pub. Date: May 6, 2021

(65) Prior Publication Data

US 2022/0381407 A1 Dec. 1, 2022

Related U.S. Application Data

(60) Provisional application No. 62/927,968, filed on Oct. 30, 2019.

(51) Int. Cl.
*F21L 14/00* (2006.01)
*F21L 2/00* (2006.01)
(Continued)

(52) U.S. Cl.
CPC ................ *F21L 14/00* (2013.01); *F21L 2/00* (2013.01); *F21V 21/08* (2013.01); *F21V 23/06* (2013.01);
(Continued)

(58) Field of Classification Search
CPC ... F21L 14/00; F21L 2/00; F21L 14/02; F21L 15/08; F21L 15/14; F21V 21/08; F21V 23/06; F21V 21/0816
See application file for complete search history.

(56) References Cited

U.S. PATENT DOCUMENTS 2,554,565 A * 5/1951 Fike ........................ F21V 15/02 362/400
3,197,631 A * 7/1965 Jensen .................... F21V 21/06 174/45 R
(Continued)

FOREIGN PATENT DOCUMENTS

EP 2733416 A1 5/2014
WO 2009011898 A2 1/2009

OTHER PUBLICATIONS

International Search Report and Written Opinion for Application No. PCT/US2020/058174 dated Feb. 23, 2021 (12 pages).

*Primary Examiner* — Ismael Negron
(74) *Attorney, Agent, or Firm* — Michael Best & Friedrich LLP

(57) ABSTRACT

A portable lighting device includes a body having an input port supported on an exterior surface of the body and an output port supported on the exterior surface of the body. The input port is operable to receive power from a power source and the output port is operable to transfer power to an external device. The portable lighting device also includes a support member coupled to the body. The support member is configured to hang the portable lighting device from a support structure. The portable lighting device further includes a lighting unit that extends downward from the body. The lighting unit is electrically coupled to the input port to receive power from the power source.

25 Claims, 11 Drawing Sheets

(51) Int. Cl.
*F21V 21/08* (2006.01)
*F21V 23/06* (2006.01)
*F21V 29/70* (2015.01)
*F21Y 113/10* (2016.01)
*F21Y 115/10* (2016.01)

(52) U.S. Cl.
CPC .......... *F21V 29/70* (2015.01); *F21Y 2113/10* (2016.08); *F21Y 2115/10* (2016.08)

(56) References Cited

U.S. PATENT DOCUMENTS

| | | | | | |
|---|---|---|---|---|---|
| 3,584,213 | A * | 6/1971 | Meltzer | F21V 17/00 | 439/893 |
| 4,173,035 | A * | 10/1979 | Hoyt | H05B 45/30 | 40/594 |
| 4,992,704 | A * | 2/1991 | Stinson | H05B 45/40 | 362/800 |
| 5,528,477 | A * | 6/1996 | Carmo | F21V 15/02 | 362/396 |
| 5,559,681 | A * | 9/1996 | Duarte | F21V 21/0808 | 362/249.14 |
| 6,210,189 | B1 * | 4/2001 | Gantt | F21V 21/005 | 439/214 |
| 6,394,623 | B1 * | 5/2002 | Tsui | F21S 4/26 | 362/249.16 |
| 6,964,495 | B2 * | 11/2005 | Schnaufer | F21S 4/20 | 362/399 |
| 7,871,180 | B2 * | 1/2011 | Wu | F21V 15/013 | 362/217.13 |
| 8,104,920 | B2 * | 1/2012 | Dubord | F21V 19/0045 | 362/225 |
| 8,206,004 | B2 * | 6/2012 | Serak | H01R 31/02 | 362/217.1 |
| 8,304,993 | B2 * | 11/2012 | Tzou | F21V 29/763 | 315/246 |
| 8,313,212 | B1 * | 11/2012 | Mayer | F21S 4/28 | 362/225 |
| 8,641,229 | B2 * | 2/2014 | Li | F21V 23/06 | 362/225 |
| 8,888,306 | B2 * | 11/2014 | Thomas | F21V 29/83 | 362/225 |
| 9,383,073 | B2 * | 7/2016 | Frost | F21S 4/22 | |
| 9,395,052 | B1 * | 7/2016 | Shew | F21K 9/27 | |
| 9,470,375 | B2 * | 10/2016 | Van Es | F21K 9/27 | |
| 9,810,386 | B2 * | 11/2017 | Hickenbottom | F21V 21/08 | |
| 10,041,660 | B2 | 8/2018 | Harvey | | |
| 10,145,547 | B2 | 12/2018 | Wills et al. | | |
| 10,281,125 | B2 | 5/2019 | Harvey | | |
| 10,429,014 | B2 * | 10/2019 | Jenks | F21V 29/70 | |
| 10,605,440 | B2 | 3/2020 | Dorman et al. | | |
| 10,794,580 | B1 * | 10/2020 | Su | F21S 4/28 | |
| 10,842,082 | B1 * | 11/2020 | Genga, Jr. | A01G 9/249 | |
| 10,907,785 | B2 * | 2/2021 | Shine | F21S 2/005 | |
| 11,092,320 | B2 | 8/2021 | Harvey | | |
| 11,162,668 | B2 | 11/2021 | Manulik et al. | | |
| D946,797 | S | 3/2022 | Dorman et al. | | |
| 2016/0029460 | A1 | 1/2016 | Bean et al. | | |
| 2018/0317293 | A1 | 11/2018 | Chen | | |
| 2019/0113212 | A1 | 4/2019 | Dorman et al. | | |

* cited by examiner

SYSTEM OF INTERCONNECTABLE PORTABLE LIGHTING DEVICES

CROSS REFERENCE TO RELATED APPLICATIONS

This application is a national stage filing under 35 U.S.C. § 371 of International Application No. PCT/US2020/058174, filed on Oct. 30, 2020, which claims priority to U.S. Provisional Patent Application Ser. No. 62/927,968, filed on Oct. 30, 2019, the entire contents of which are incorporated by reference herein.

BACKGROUND OF THE INVENTION

The present invention relates to portable lighting devices and, more particularly, to hanging lights.

Lighting is needed for worksites that operate at night or in poorly lit indoor spaces. Often times, the worksites are under-developed and do not include a dedicated lighting system. Typically, portable lights are supplied to provide the light needed to operate the worksite.

SUMMARY

The present invention may provide, in one independent aspect, a lighting system including a first portable lighting device. The first portable lighting device includes a first body with a first input port that is operable to receive power from a power source and a first output port. The first portable lighting device also includes a first support member that is coupled to the first body. The first support member is configured to hang the first portable lighting device from a support structure. The first portable light also includes a first lighting unit supported by the first body. The first lighting unit includes a light emitting diode. The lighting system also includes a second portable lighting device having a second body with a second input port and a second output port. The second lighting device also includes a second support member coupled to the second body. The second support member is configured to hang the second portable lighting device from a support structure. The second portable lighting also includes a second lighting unit supported by the second body. The second lighting unit includes a light emitting diode. The lighting system further includes a power cord having a first end removably coupled to the first output port of the first portable lighting device and a second end removably coupled to the second input port of the second portable lighting device. The power cord is configured to transfer power from the first portable lighting device to the second portable lighting device.

The present invention provides, in another independent aspect, a portable lighting device including a body having an input port supported on an exterior surface of the body and an output port supported on the exterior surface of the body. The input port is operable to receive power from a power source and the output port is operable to transfer power to an external device. The portable lighting device also includes a support member coupled to the body. The support member is configured to hang the portable lighting device from a support structure. The portable lighting device further includes a lighting unit that extends downward from the body. The lighting unit is electrically coupled to the input port to receive power from the power source.

The present invention provides, in another independent aspect, a portable lighting device including a body having an input port, a first output port, and a second output port. The first input port is operable to receive power from a power source. The first output port is electrically coupled to the input port and configured to connect to a second portable lighting device by a first power cord. The second output port is electrically coupled to the input port and configured to connect to a third portable lighting device by a second power cord. The portable lighting device also includes a support member coupled to the body. The support member is configured to hang the portable lighting device from a support structure. The portable lighting device further includes a lighting unit extending downwardly from the body. The lighting unit is electrically coupled to the input port to receive power from the power source.

Other independent features and independent aspects of the invention may become apparent by consideration of the following detailed description and accompanying drawings.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

DETAILED DESCRIPTION

Figure 1:
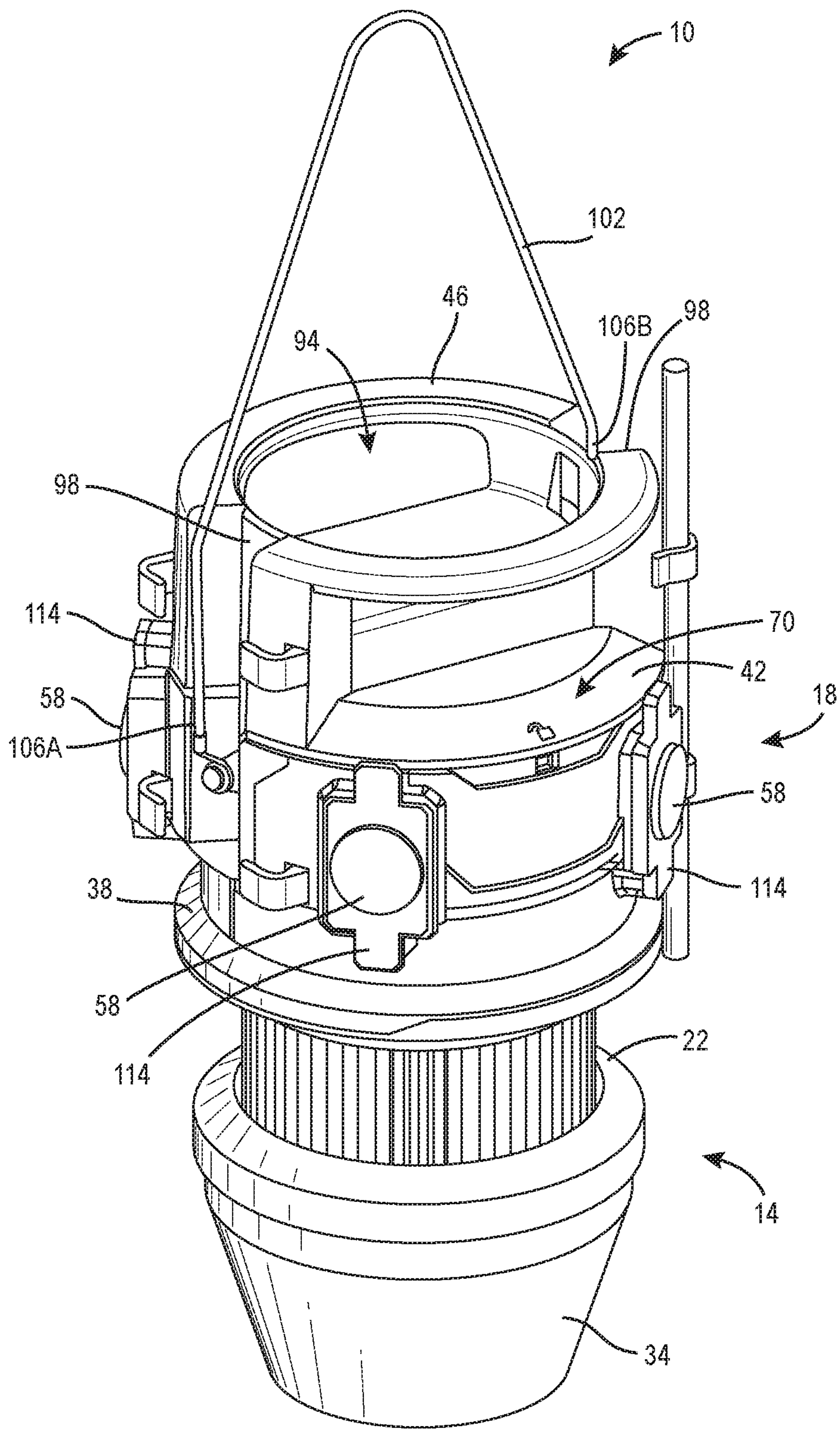
FIG. 1 is a perspective view of a portable lighting device.
Figure 2:
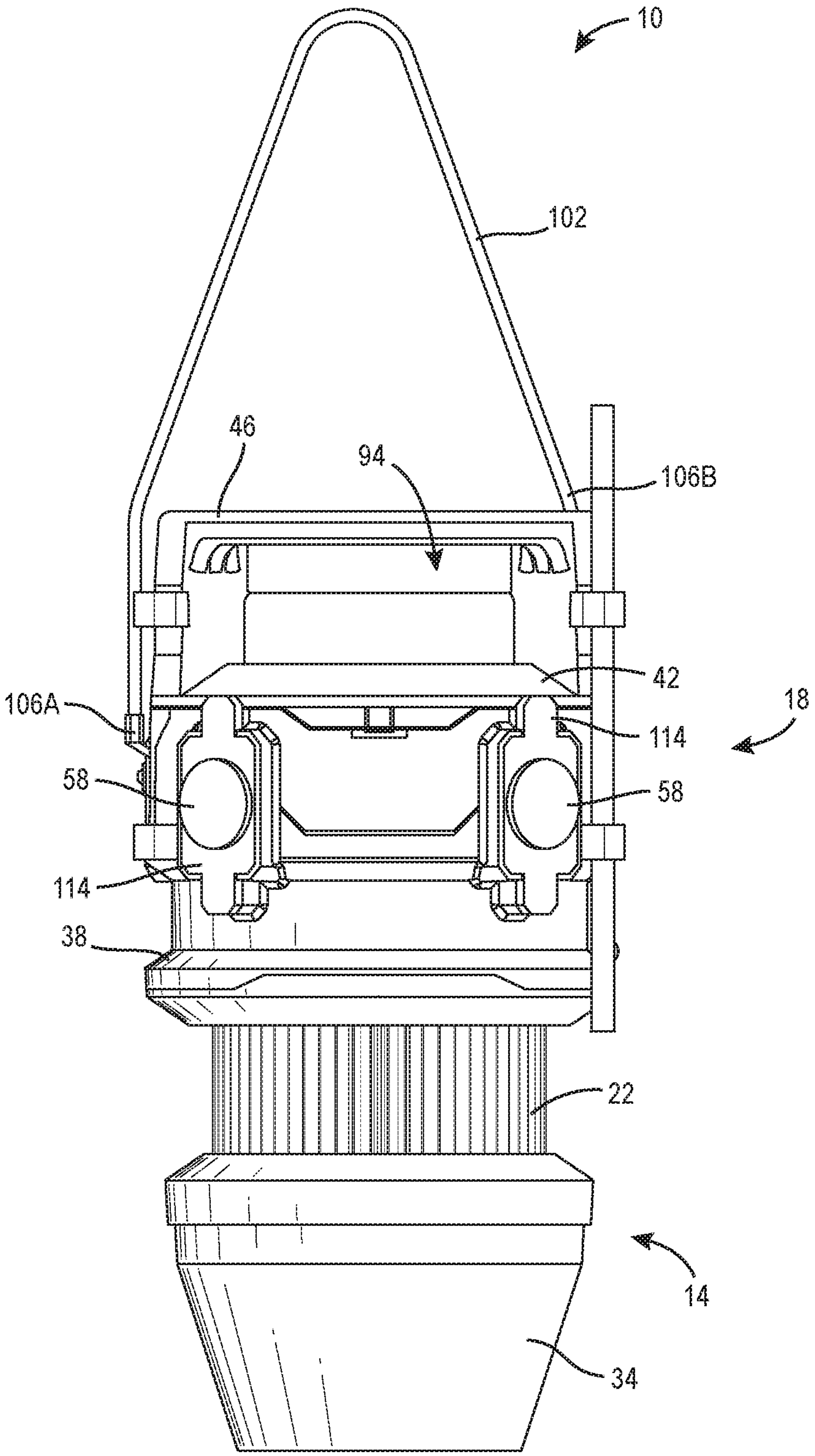
FIG. 2 is a first side view of the portable lighting device of FIG. 1.
Figure 3:
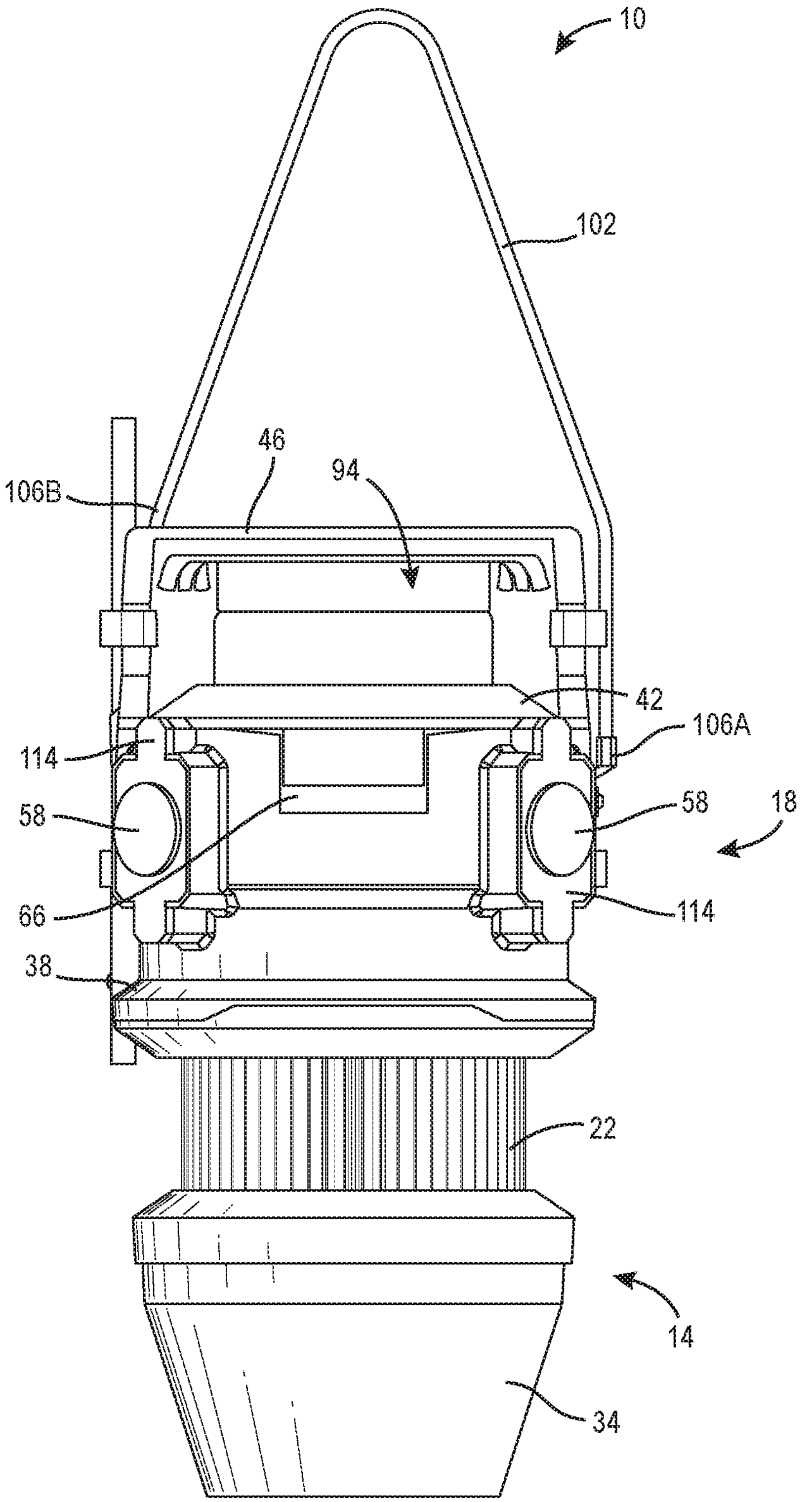
FIG. 3 is a second side view of the portable lighting device of FIG. 1.

FIGS. 1-3 illustrate a portable lighting device 10, such as, for example, a high bay light or work light used at construction sites or other work sites. The illustrated lighting device 10 includes a lighting unit 14 and a body 18. The lighting device 10 is designed to be portable and optionally includes features to allow a user to hang the lighting device 10 from another object, such as an overhead beam, rafter, pipe, etc. In the illustrated embodiment, the lighting device 10 outputs 130 watts of power. In other embodiments, the lighting device 10 may output between 50 watts and 150 watts of power. In further embodiments, the lighting device 10 may output less than 50 watts. For the example, the lighting device may output between 5 watts and 50 watts.

The lighting unit 14 is supported by the body 18. As shown in FIGS. 1-3, the lighting unit 14 extends downwardly from the body 18 in an axial direction. In the illustrated embodiment, the lighting unit 14 includes a heat sink 22 that supports one or more light emitting diodes 30 (LEDs) and a lens 34. In other embodiments, the heat sink 22 may support other types of light sources. Moving to FIG. 4, the heat sink extends downward from the body and partially extends into the lens 32 leaving a portion of the heat sink exposed to the environment outside of the lens 34. The LEDs 30 are positioned on a support located at least partially within a cavity 26 of the heat sink 22. The illustrated cavity 26 is formed through a center of the heat sink 22. The LEDs 30 are positioned near the bottom, if viewed from the hanging orientation, of the heat sink 22. In other embodiments, the LEDs 30 of the lighting unit 14 may be arranged in other configurations, or the lighting unit 14 may include a single LED. For example, the LEDs 30 may be a corn cob style LED including a plurality of strips of LEDs arranged circumferentially around a support to provide light to an area above the lighting device 10. In further embodiments, the LEDs 30 may be chip on board (COB) LEDs that include more diodes. Additionally, the LEDs 30 are rated to produce an output of over 12,000 Lumens.

With continued reference to FIGS. 1-3, the lens 34 is coupled to a bottom end of the heat sink 22. The lens 34 contains and protects the LEDs 30 within the lighting unit 14, while also acting to diffuse light emitted by the LEDs 30. In some embodiments, the lens 34 is constructed from an impact resistant plastic, such as high density polyethylene (HDPE). In other embodiments, the lens 34 may be constructed from other materials (e.g., different plastics, glass, etc.). In further embodiments, the lighting unit 14 may include a reflector that reflects light upwards to an area above the LEDs 30 and the lighting device 10. For example, the reflector may be positioned on the bottom of the lens 34 or other surface of the lighting unit 14. Additionally or alternatively, the lighting unit 14 may include piping to direct light from the LEDs 30 to the area above the LEDs.

The illustrated lens 34 is also detachably coupled to the heat sink 22, allowing the lens 34 to be easily cleaned and/or replaced. In some embodiments, the lens 34 may be threadably coupled to the heat sink 22. In other embodiments, the lens 34 may be detachably coupled to the heat sink 22 in other suitable manners (e.g., press fitting, detents, bayonet couplings, etc.).

Figure 4:
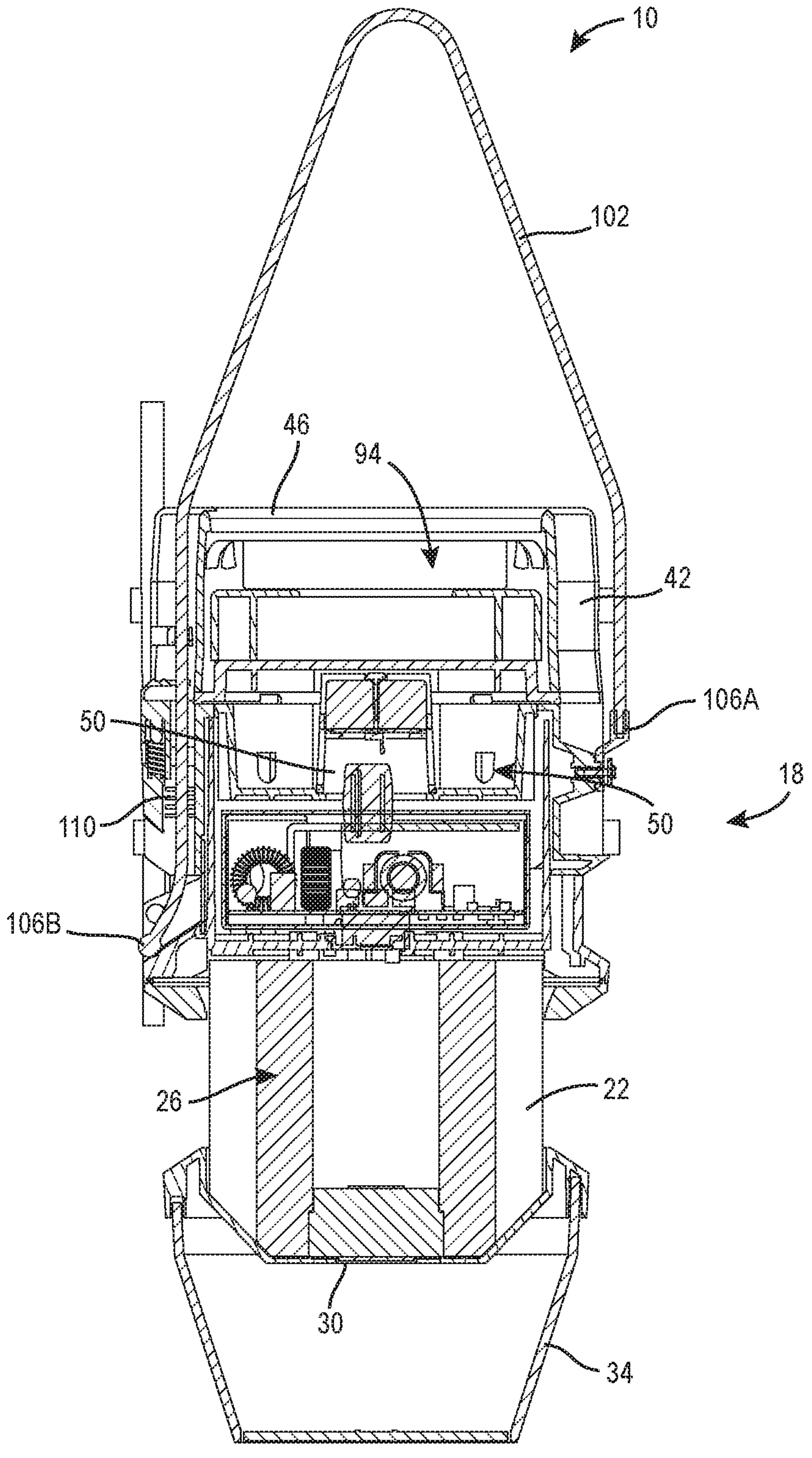
FIG. 4 is a cross-sectional view of the portable lighting device of FIG. 1 taken along lines 4-4.
Figure 6:
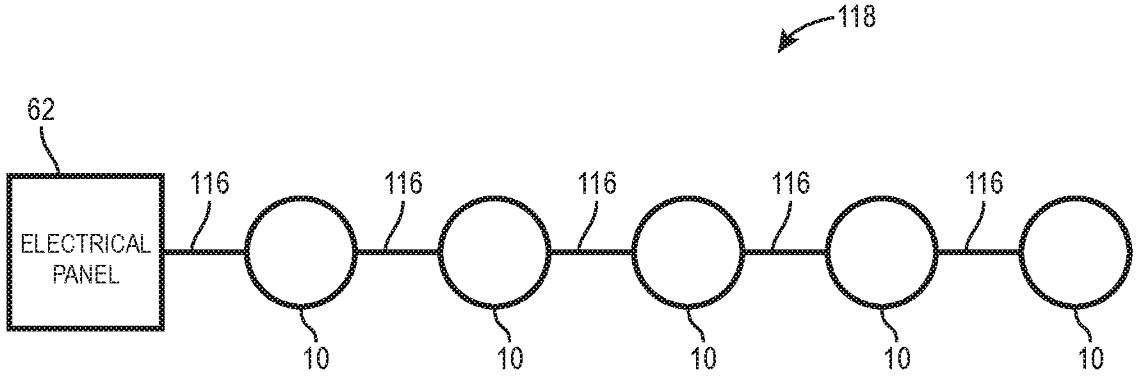
FIG. 6 is a top view of a lighting system including a plurality of portable lighting devices.

The illustrated body 18 is generally cylindrically-shaped and includes a base 38, a cover 42, and an annular rim 46. The base 38 is coupled to the lens 34. As shown in FIG. 4, the base 38 has an interior cavity 50 that receives a terminal block 54. A plurality of electrical ports 58 (e.g., electrical outlets) are formed in the base 38 in communication with the interior cavity 50. In the illustrated embodiment, the base 38 includes four electrical ports 58, although in other embodiments the base 38 may include more than or less than four electrical ports 58. As further described below, the ports 58 may electrically connect the lighting device 10 to other similar lighting devices 10 or to a power source, such as an electrical panel 62 (FIG. 6).

The cover 42 is movably coupled to the base 38 for movement between a closed configuration and an open configuration. The cover 42 encloses the interior cavity 50 of the base 38 when in the closed configuration. The cover 42 is pivotally coupled to the base 38 by a hinge 66 (FIG. 3). The hinge 66 allows the cover 42 to pivot to the open configuration. In some embodiments, such as the illustrated embodiment, the cover 42 is biased to the open configuration by one or more springs (e.g., torsion springs).

Figure 5:
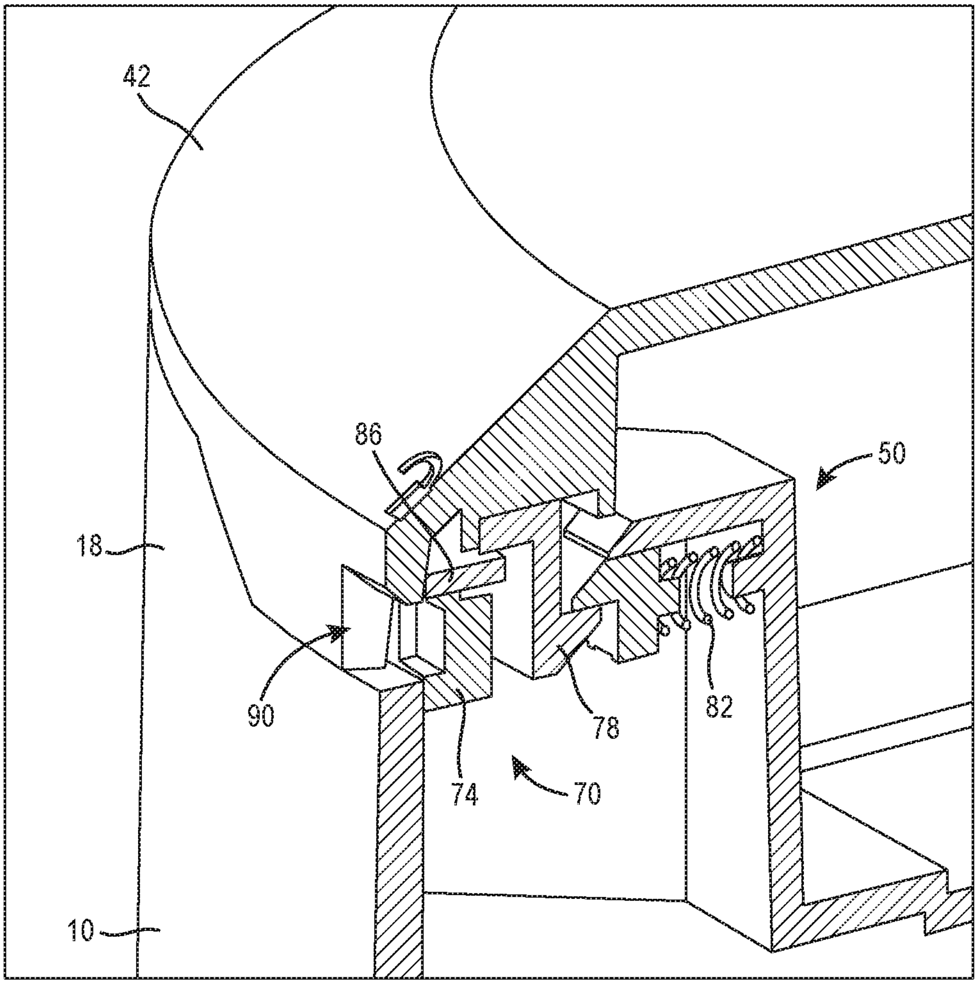
FIG. 5 is a perspective view of a cover locking mechanism of the portable lighting device of FIG. 1.

However, the cover 42 also includes a locking mechanism 70 to maintain the cover 42 in the closed configuration against the bias of the spring(s). With reference to FIG. 5, the locking mechanism 70 maintains the cover 42 in the closed configuration and allows the cover 42 to move toward the open configuration to allow access to the interior cavity 50. The illustrated locking mechanism 70 includes a trigger 74, a latch 78, and a resilient member 82. The resilient member 82 biases the latch 78 into engagement with a flange 86 on the cover 42 to hold the cover 42 against the body 18 of the device 10. In some embodiments, the resilient member 82 may be, for example, a coil spring, although it may be other types of resilient members.

The trigger 74 is moveable towards the latch 78 to push the latch 78 away from the cover 42, allowing the cover 42 to open. A hole 90 in the cover 42 allows access to the trigger 74. In some embodiments, a tool or other object may be inserted into the hole 90 to push the trigger 74 against the bias of the resilient member 82 to release the latch 78. That is, the trigger 74 pushes the latch 78 inwardly to move the latch 78 out of engagement with the flange 86 of the cover 42. The cover 42 may then be opened (e.g., manually and/or by the springs). The locking mechanism 70 is contained within itself so that dust and dirt do not get into the interior cavity 50 of the device 10.

As shown in FIGS. 1-3, the annular rim 46 is supported by the cover 42 above the base 38. The annular rim 46 defines a generally circular opening 94 in the body 18. The annular rim 46 also includes two channels 98 (FIG. 1) formed in an outer surface of the rim 46. The channels 98 extend continuously through an outer surface of the cover 42. As further explained below, the channels 98 are configured to receive portions of a hanging cable 102 to help guide the cable 102.

With continued reference to FIGS. 1-3, the hanging cable 102 is coupled to the body 18. The hanging cable 102 is configured to hang the lighting device 10 from a support structure, such as an overhead beam, rafter, or pipe. The hanging cable 102 includes a first end 106A secured to the body 18 by a pin, rivets, a hook, etc. The hanging cable 102 also includes a second end 106B (FIG. 3) opposite from the first end 106A and adjustably coupled to a cable clamp mechanism 110 of the lighting device 10. The cable clamp mechanism 110 allows for quick and easy installation of the lighting device 10 to a support, rafter, or the like. In other embodiments, the lighting device 10 may include other types of support members other than or in addition to the hanging cable 102. For example, the support member may be a hook, a bracket, and like.

As described above, the body 18 includes four electrical ports 58. In the illustrated embodiment, the electrical ports 58 are supported on an exterior surface of the body 18. The electrical ports 58 are evenly spaced around the circumference of the body 18. In other embodiments, electrical ports 58 may be positioned on other features of the lighting device 10 such as the annular rim 46 or within the opening 94. The electrical ports 58 include a cover 114 that inhibits dust, water, and other particles from entering the cavity 50. In other embodiments, the electrical ports 58 could include a bonnet or shroud placed around the body 18 of the lighting device 10 to protect the ports 58. In another embodiment, the electrical output ports 58 may be protected by an in-use cover.

The electrical ports 58 are in communication with the terminal block 54 to provide power from a power source to the LEDs 30 or other components on the lighting device 10. The terminal block 54 may also optionally direct the power to additional lighting devices 10 through a modular power cord 116 (FIG. 6). The power cords 116 may be coupled to the electrical ports 58 by a connector that inhibits the cords 116 from unintentionally disconnecting from the ports 58. The connector may include threads that correspond to threads on the cord 116 that threadably fasten the cord 116 to the ports 58. In some embodiments, the cord 116 may include a twist lock connector on each end of the cord. In other embodiments, the cord 116 may include bayonet-style connectors or other types of connectors. Alternatively, the ports 58 may include a twist lock or other fastening means to secure the cord 116 to the lighting device 10.

Figure 7:
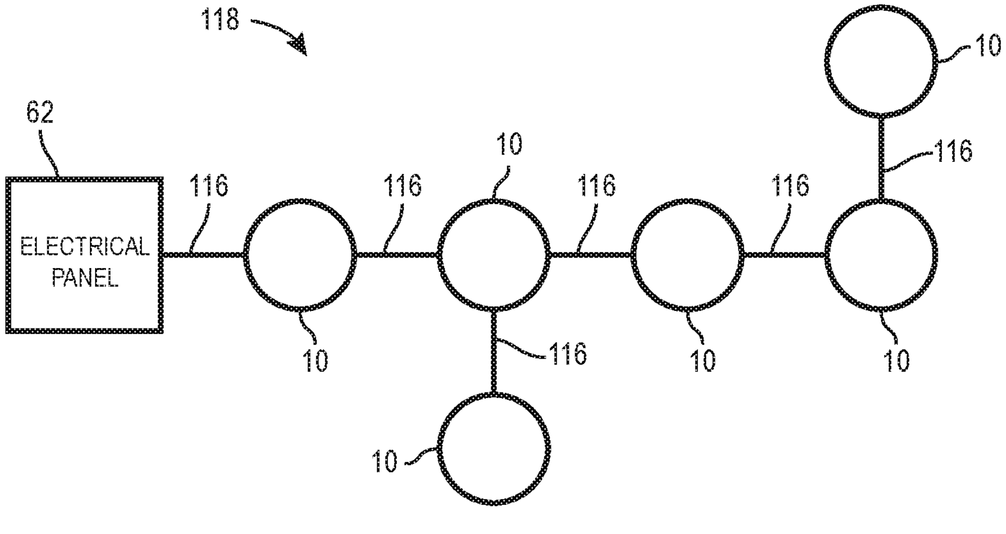
FIG. 7 is a top view of another lighting system including a plurality of portable lighting devices.

As shown in FIGS. 6-7, multiple lighting devices 10 may be connected by power cords 116 to form a lighting system 118. As such, one of the electrical ports 58 is an input port and three of the electrical ports 58 are an output port. In other words, one of the electrical ports 58 may be coupled to the electrical panel 62 through a power cord 116 to provide power to one of the lighting devices 10. The input port 58 is capable of accepting 120-277 volts from the electrical panel 62. The three output electrical ports 58 may be coupled to other lighting devices 10 through additional power cords 116 to provide power to the other devices 10. For instance, as shown in FIG. 6, multiple lighting devices 10 may be arranged in a serial configuration. In such embodiments, each lighting device 10 (except the final lighting device) provides power to one other lighting device 10. Alternatively, as shown in FIG. 7, lighting devices 10 can be branched off in different directions from one another. As such, one lighting device may provide power to multiple lighting devices. In some embodiments, multiple lighting devices 10 may be connected by a communication cable (e.g., an ethernet cable). The communication cable may run in parallel with the power cords 116 to provide a network connection to the lighting devices 10. The communication cables may provide information or instructions from a network to the lighting devices 10 to control operation of the lighting devices 10.

The lighting devices 10 may include an indicator 119 (FIG. 11) to communicate to a user that there are too many lighting devices 10 in the lighting system 118. For example, the indicator 119 may be coupled in series with the electrical ports 58 to monitor the power received in the lighting device 10 from a power source or an adjacent lighting device 10 in the lighting system 118. If the power received is below a predetermined threshold, the indicator 119 would notify a user that there are too many lighting devices 10 in the lighting system 118. In some embodiments, the indicator 119 may be a light that turns on when the power is below the predetermined threshold. In other embodiments, the indicator 119 may be a buzzer or other device that produces a sound when the power is below the predetermined threshold. Further, the indicator 119 may send a signal via a wireless communication device to a user's smart phone or other external device to indicate that the power was below the predetermined threshold.

In one example, a plurality of lighting devices 10 may be electrically connected to a common power source via the cords 116. If the first lighting device 10 is coupled to the external power source or electrical panel 62, and each subsequent lighting device 10 is coupled to the input port 58 of an adjacent device 10, the number of lighting devices 10 that may be connected in series is limited by the power usage of each upstream device 10. Accordingly, a greater number of lighting devices 10 and/or other peripheral devices may be coupled in series.

In some scenarios, the output electrical ports 58 may also be connected to other types of devices, such as battery chargers, power tools, radios, and the like. The other types of devices may be connected to the output ports 58 by standard extension cords. As such, each lighting device 10 may also act as an overhead power source to provide power to other tools devices, or the like. In some embodiments, a remote power hub (e.g., a power strip) can be plugged into one of the electrical ports 58 and hang down to a height reachable by a person standing on the ground. Further, the lighting device 10 may include an additional dedicated output port to provide power to an exit sign.

Figure 11:
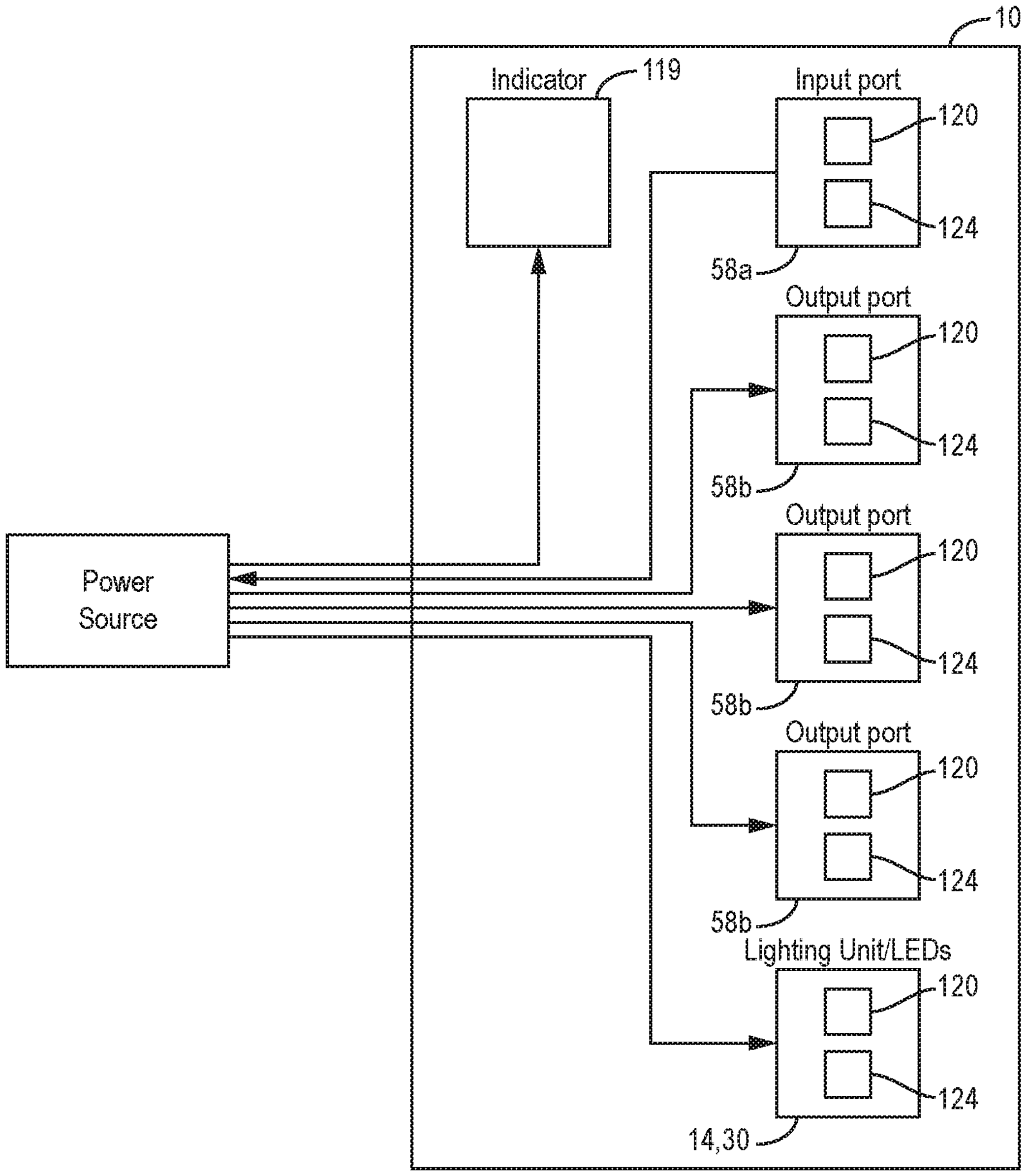
FIG. 11 is a schematic drawing of the portable lighting device of FIG. 1.

With reference to FIG. 11, each of the electrical ports 58 of the lighting device 10 includes a power circuit 120. As shown, one power circuit 120 may be associated with the lighting unit 14, while the other power circuits 120 are associated with the electrical ports 58. In the illustrated embodiment, one of the electrical ports 58 is an input port 58*a* and three of the electrical ports 58 are an output port 58*b*. In some embodiments, the lighting device 10 may include three power circuits 120 (e.g., one electrical circuit 120 for the LEDs 30, one electrical circuit 120 for the input port 58*a*, and one electrical circuit 120 for one of the output ports 58*b*). Each of the power circuits 120 include its own dedicated breaker 124 so that if one of the breakers 124 for the electrical ports 58 goes out, the lighting device 10 may still provide power to the LEDs 30 or to the other electrical ports 58. Similarly, in other embodiments, the power circuits 120 may each include their own dedicated breaker 124 in the electrical panel 62. Each power circuit 120 may be capable of handling 15-25 amps. Additionally, the power circuits 120 may have ground fault circuit interruption (GFCI) protection either at an electrical panel or at the lighting device 10. Including dedicated power circuits 120 and breakers 124 on a modular lighting device 10 allows the lighting device 10 to provide power to additional lighting devices 10 and other modules such as a wireless communication device, as described below.

Figure 12:
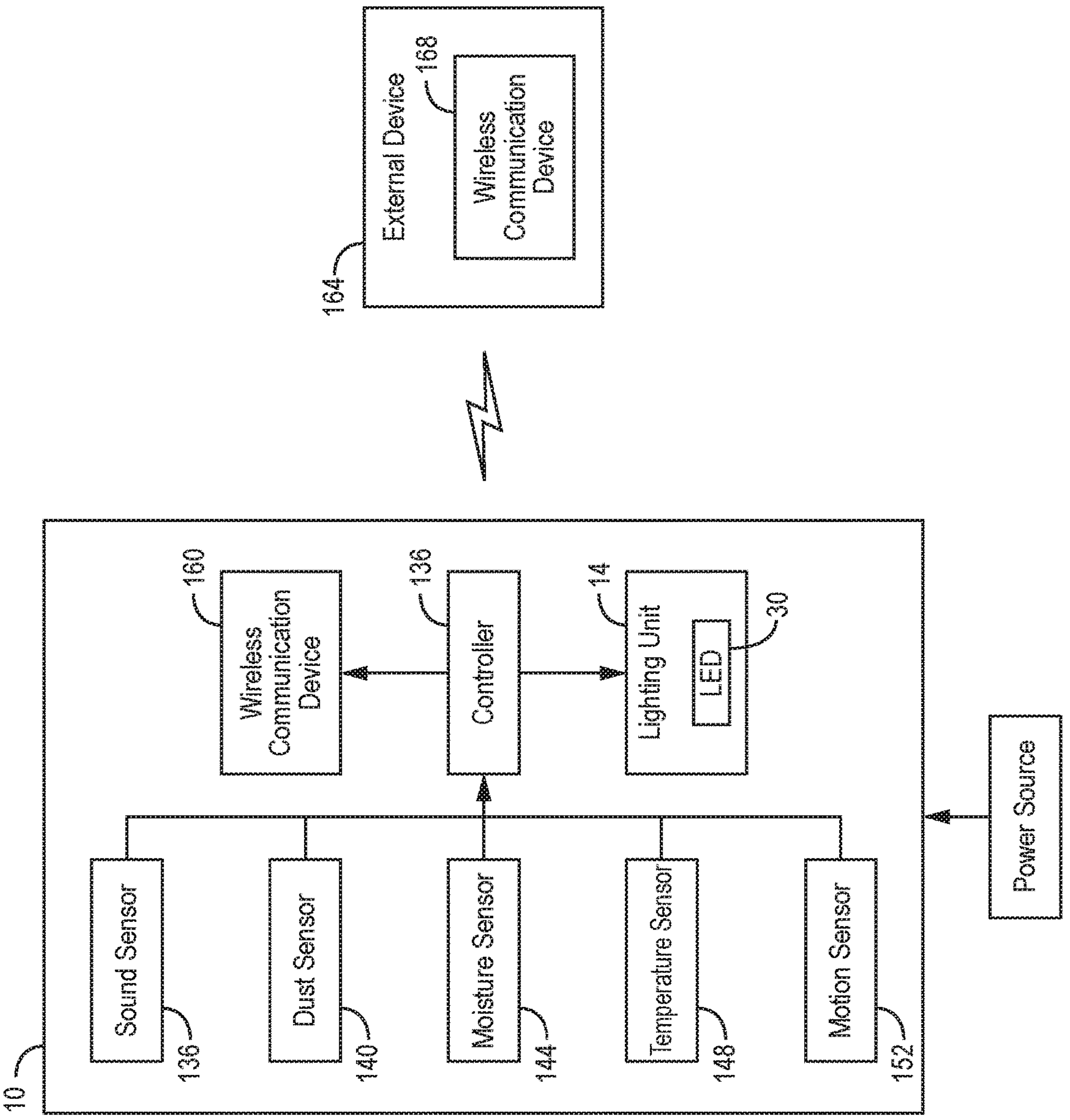
FIG. 12 is another schematic drawing of the portable lighting device of FIG. 1.

With reference to FIG. 12, the lighting device 10 includes one or more sensors. The sensors may be environmental sensors to monitor the environment around the lighting device 10. For example, the lighting device 10 may include a sound sensor 136 to detect if a worker is near the lighting device 10 and activate the lighting device 10 in response to the sound. The sound sensor 136 may also or alternatively monitor if a noise level (e.g., decibel level) exceeds a threshold and alert nearby workers. In addition, the lighting device 10 may include a dust sensor 140 to detect the amount of dust and other particulates in the air and provide a warning if the dust level is unsafe for workers to enter the area. Also, the lighting device 10 may include a moisture sensor 144 to detect the amount of moisture in the air around a lighting device 10 to make sure the area is safe. Further, the lighting device 10 may include a temperature sensor 148 to detect the temperature around the areas of the lighting device 10. Additionally, the lighting device 10 may include a motion sensor 152 or camera to detect if a crew member is within the vicinity of the lighting device 10 and activate the LEDs 30 in response to the motion.

The sensors 136, 140, 144, 148, 152 provide feedback to a controller 156 within the lighting device 10. The controller 156 can then send a signal indictive of the feedback from the sensors via a wireless communication device 160 to an external device 164 (e.g., a remote control or smart phone)

to control operation of the lighting device 10. For example, the external device 164 may include a wireless communication device 168 that is operable to send a signal to the wireless communication device 160 of the lighting device 10. The signal would then be processed by the controller 156 to control the lighting unit 14 and the LEDs. Further, the controller 156 may control other modules that may be connected to one of the electrical ports 58 of the lighting device. The sensors 136, 140, 144, 148, 152 may also cause the lighting device 10 to operate in different ways (e.g., change colors, flash, etc.) to provide feedback to workers in the area. In some embodiments, the wireless communication device may also provide wireless fidelity (WiFi) to the surrounding area around the lighting device. For example, the lighting device 10 may provide power to a satellite module or a node to extend the wireless capability of a wireless network. Further, multiple satellite modules or nodes may be placed in multiple lighting devices 10 within the lighting system 118 to extend a wireless network throughout a worksite. Alternatively, a WiFi router or modem may be powered by one of the outlet ports 58 to provide connection to the internet.

Figure 8:
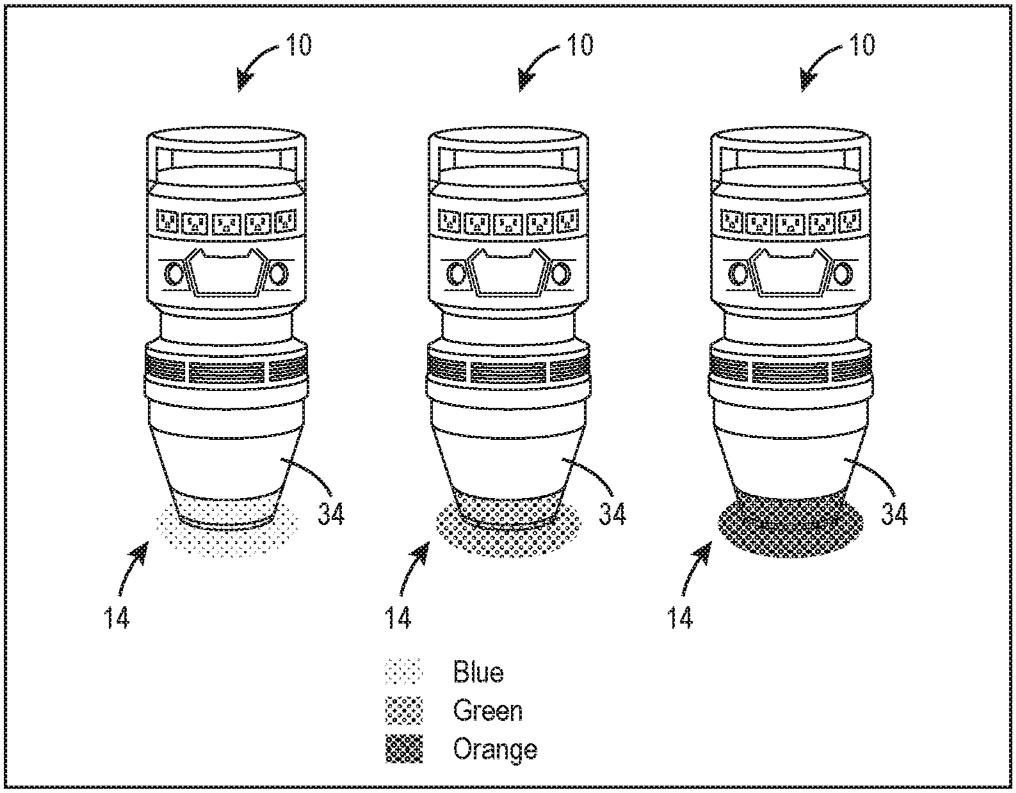
FIG. 8 is a perspective view of the portable lighting device producing different colored light.

With reference to FIG. 8, the lighting device 10 may produce lights of different colors such as blue, green, orange, red, etc. For example, the lighting unit 14 may include different colored lenses 34 to produce different colored light. Alternatively, the LEDs 30 may be a different colors to produce a different colored light. Different colored lights may indicate to a user a specific path to follow. For instance, specific lighting devices 10 within the lighting system 118 may produce blue light to indicate the direction to a particular zone or area in the worksite. In some embodiments, the LEDs 30 may be controlled by a wireless device to change the color of the LEDs 30. For example, in an emergency the wireless device may turn the LEDs 30 to red to indicate to users to exit the worksite. Further, certain colors may indicate an exit or entrance to a specific job site. In addition, the lens 34 may include a color strip or a reflective strip to indicate that the user is in a specific zone or area within the worksite.

In operation, the device 10 may be hung on or otherwise connected to an external structure via the hanging cable 102. The lighting device 10 is also electrically coupled to a power source, such as a DC power source (e.g., a battery pack) or an AC power source (e.g., a standard 120V power outlet or an electrical panel 62) via one or more electrical wires or the cord 116, to power the LEDs 30 of the lighting unit 14. The light emitted by the LEDs 30 passes through the lens 34, which diffuses light to provide light to a larger area and to provide more uniform lighting. Furthermore, additional lighting devices 10, or other peripheral devices, may be coupled to the lighting device 10 via the electrical ports 58 as described above.

Figure 9:
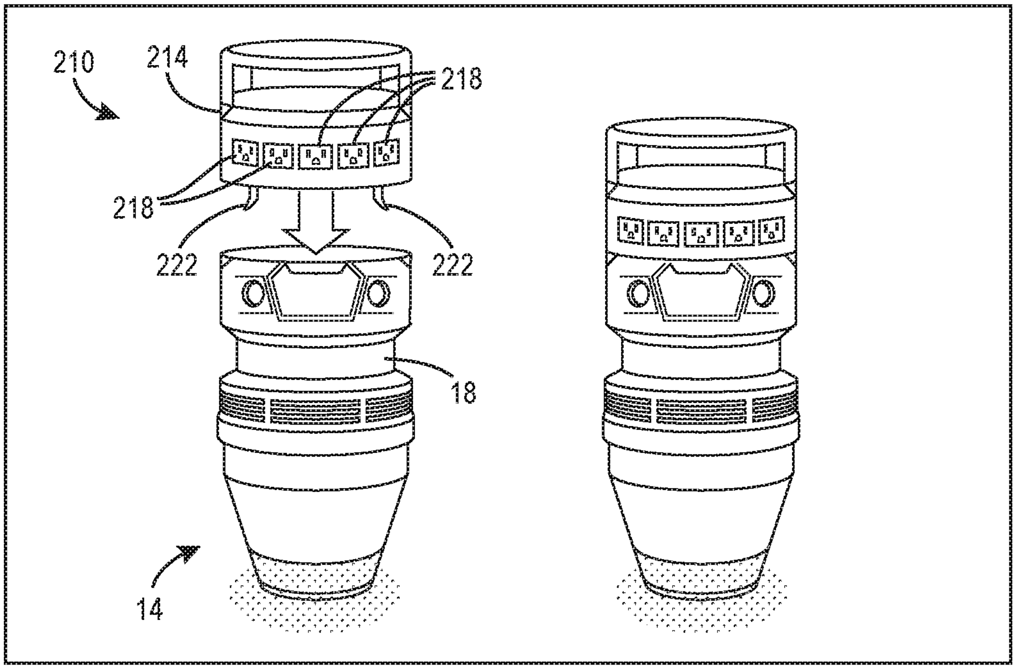
FIG. 9 is a perspective view of a portable lighting device according to another embodiment of the invention.

FIG. 9 illustrates a lighting device 210 according to another embodiment of the invention. The lighting device 210 is similar to the lighting device 10 with like features being represented with like numerals. The lighting device 210 includes the body 18, the lighting unit 14 coupled to the body 18, and a power head 214 electrically coupled to the body 18. The power head 214, or hub, includes a plurality of electrical ports 218 positioned an outer surface of the power head 214. The ports 218 are in electrical communication with a terminal block (not shown) inside the power head 214. The ports 218 are similar to the ports 58 described above with reference to the lighting device 10. As such, the ports 218 may be either an input port 58 to receive power, or an output port 58 to transfer power to other lighting devices 10. The power head 214 also includes a pair of electrical connectors 222. The electrical connectors 222 couple to electrical connectors of the body 18 to provide power to the lighting unit 14.

The lighting unit 14 is removably coupled to the power head 214. In other words, the lighting unit 14 is a modular lighting unit 14. In some embodiments, the lighting unit 14 may be coupled to the power head 214 by a detent mechanism, fasteners, a bayonet style connection, a threaded connection, or the like. The modularity of the power head 214 and the lighting unit 14 allows different lighting units 14 to be attached to the same power head 214. For example, different powers of lighting units 14 can be attached to the power head 214, such as a 70 W lighting unit or a 130 W lighting unit. Alternatively, different colors or styles of lighting units 14 can be attached to the power head 214.

Figure 10:
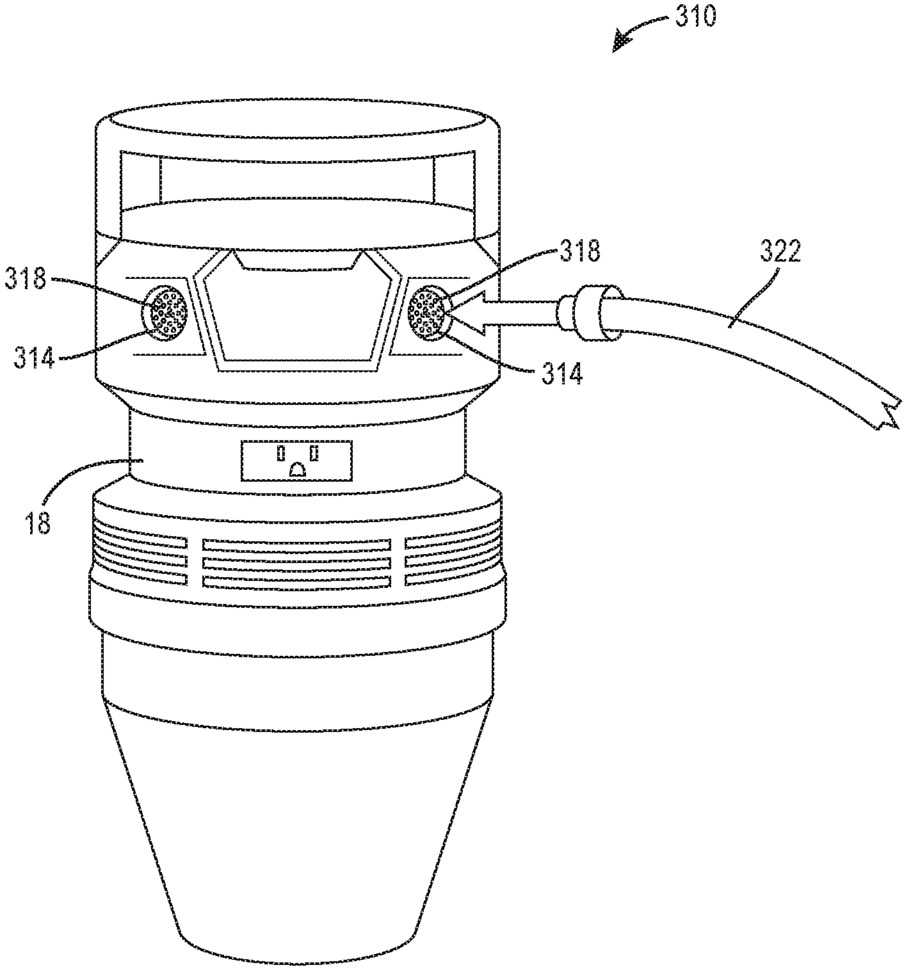
FIG. 10 is a perspective view of a portable lighting device according to another embodiment of the invention.

FIG. 10 illustrates a lighting device 310 according to another embodiment of the invention. The lighting device 310 is similar to lighting device 10 with like features being represented with like reference numbers. The illustrated lighting device 310 includes two wire clamps 314 (e.g., strain reliefs) supported by the body 18 at ports 318. The wire clamps 314 help secure electrical wires 322 to the lighting device 310, inhibiting the wires 322 from being unintentionally pulled out of the ports 318. The illustrated lighting device 310 includes two ports 318 and two cable clamps 314. In other embodiments, the lighting device 310 may include more than two ports 318 or one port 318 and an associated cable clamp 314. One of the ports 318 is associated with input terminals on a terminal block (not shown), and one of the ports 318 is associated with output terminals on the terminal block. The wire clamps 314 may include securing means that secure the wires 322 within the port 318. The securing means may be a movable door, a rotatable fastener, or the like. The wires 322 secured in the wire clamps 314 may provide power form the lighting device 310 to another device or charger positioned below the lighting device 310. For example, the wires 322 may charge batteries positioned on the floor of a worksite.

Figure 13:
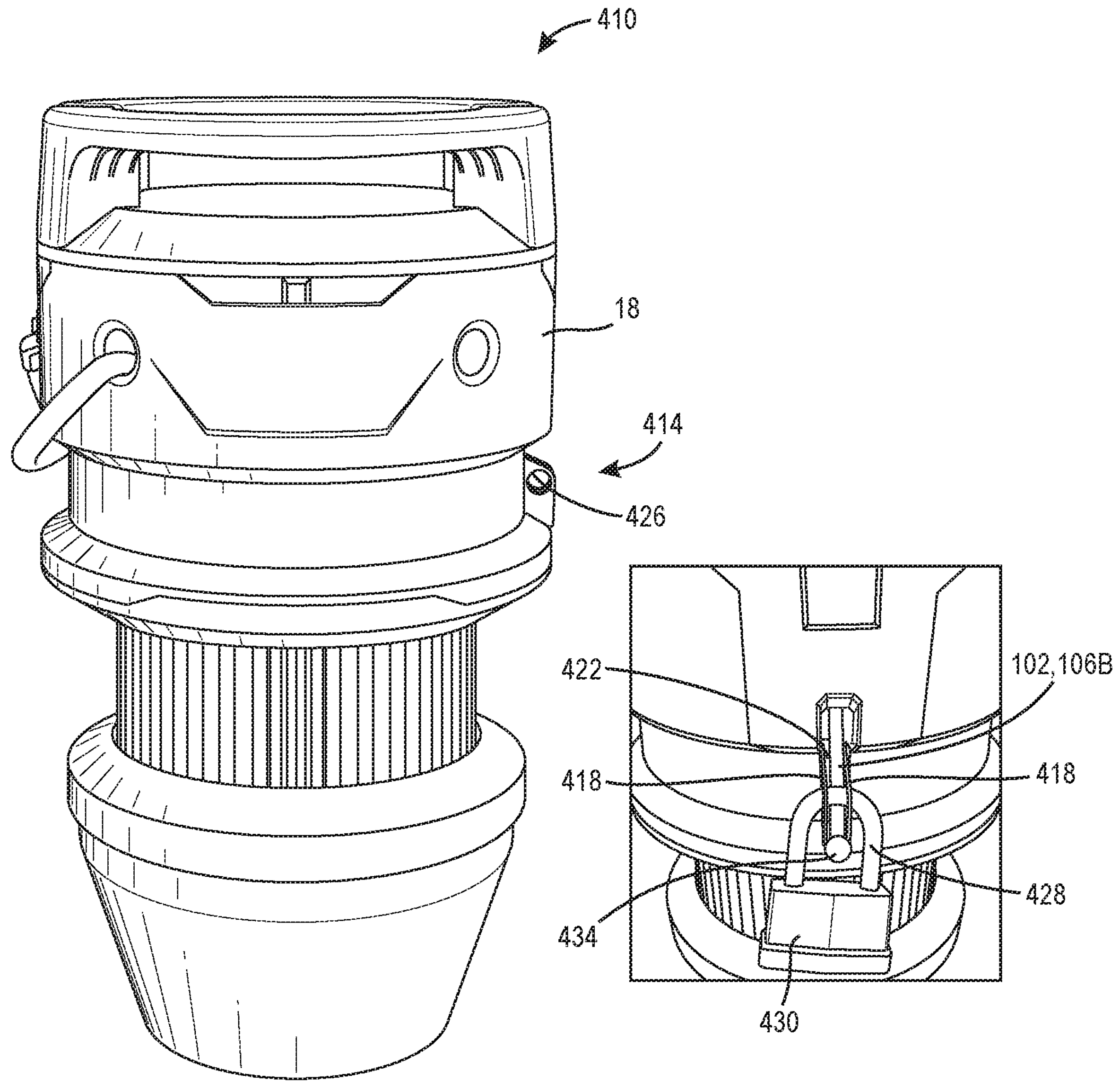
FIG. 13 is a perspective view of a portable lighting device according to another embodiment of the invention.

FIG. 13 illustrates a lighting device 410 according to another embodiment of the invention. The lighting device 410 is similar to the lighting device 10 with like features being represented with like reference numbers. The illustrated lighting device 410 includes a hasp (e.g., lock hasp 414) for the cable 102 to inhibit the lighting device 410 from being stolen. The lock hasp 414 is coupled to the body 18 and includes two brackets 418 that define a space 422 therebetween. Each bracket 418 includes an aperture 426 that is configured to receive a shackle 428 of a lock 430. The space 422 of the lock hasp 414 is operable to receive the second end 106B of the cable 102. To inhibit the lighting device 410 from being stolen, a user may position the second end 106B of the cable 102 in the space 422 between the brackets 418. A user may then position the shackle 428 of the lock 430 within the apertures 426 and close the lock 430. The shackle 428 prevents a detent or other enlargement 434 at the second end 106B of the hanging cable 102 from being removed from the lock hasp 141, therefore, preventing the lighting device 410 from being removed from a support structure.

Although the invention has been described in detail with reference to certain preferred embodiments, variations and modifications exist within the scope and spirit of the inventions.

Various features and advantages of the invention are set forth in the following claims.

What is claimed is:

1. A portable lighting device comprising:

a body having an input port supported on an exterior surface of the body and an output port supported on the exterior surface of the body, the input port operable to receive power from a power source, the output port operable to transfer power to an external device;

a support member coupled to the body, the support member configured to hang the portable lighting device from a support structure; and a lighting unit extending downwardly from the body, the lighting unit electrically coupled to the input port to receive power from the power source, the lighting unit including a heat sink extending downwardly from the body, a light source supported by the heat sink, and a lens covering the light source.

2. The portable lighting device of claim 1, wherein the lighting unit and the input port each include a dedicated power circuit.

3. The portable lighting device of claim 1, wherein the lighting unit and the input port each include a dedicated breaker.

4. The portable lighting device of claim 1, wherein the input port, the output port, or both are positioned on an upper side of the body opposite from the lighting unit.

5. The portable lighting device of claim 1, wherein the heat sink is partially exposed to the environment outside of the lens.

6. The portable lighting unit of claim 1, further comprising an indicator that is operable to signal when power from the power source is below a predetermined threshold.

7. The portable lighting device of claim 1, wherein the body is a power head that is removably coupled to the lighting unit.

8. The portable lighting device of claim 1, wherein the lighting unit includes a light emitting diode.

9. The portable lighting device of claim 8, wherein the light emitting diode is operable to emit more than one color of light.

10. The portable lighting device of claim 1, wherein the support member is a hanging cable.

11. The portable lighting device of claim 10, wherein the body further includes a lock hasp, the lock hasp configured to receive a lock and inhibit removal of the hanging cable when the hanging cable is positioned in the lock hasp.

12. The portable lighting device of claim 1, further comprising a sensor supported by the body, the sensor configured to monitor the environment around the portable lighting device.

13. The portable lighting device of claim 12, wherein the sensor includes one or more selected from a group consisting of a sound sensor to detect sound, a dust sensor to detect the amount of dust and other particulate in the air, a moisture sensor to detect the amount of moisture in the air, and a temperature sensor to detect the temperature.

14. The portable lighting device of claim 12, wherein the external device is a first external device, and wherein the portable lighting device further comprises a wireless communication device, the wireless communication device configured to send a signal to a second external device based on an output from the sensor.

15. A portable lighting device comprising:

a body having an input port, a first output port, and a second output port, the first input port operable to receive power from a power source, the first output port electrically coupled to the input port and configured to connect to a second portable lighting device by a first power cord, the second output port electrically coupled to the input port and configured to connect to a third portable lighting device by a second power cord;

a support member coupled to the body, the support member configured to hang the portable lighting device from a support structure; and a lighting unit extending downwardly from the body, the lighting unit electrically coupled to the input port to receive power from the power source, wherein the lighting unit includes a heat sink extending downwardly from the body, a light source supported by the heat sink, and a lens covering the light source, and wherein the heat sink is partially exposed to the environment outside of the lens.

16. The portable lighting device of claim 15, wherein the lighting unit includes a light emitting diode.

17. The portable lighting device of claim 15, wherein the support member is a hanging cable.

18. The portable lighting device of claim 15, further comprising a first wireless communication device supported by the body and an external device including a second wireless communication device, and wherein the first wireless communication device is operable to receive a signal from the external device to control the lighting unit.

19. The portable lighting device of claim 15, wherein the body includes a third output port, the third output port electrically coupled to the input port and configured to connect to a third portable lighting device by a third power cord.

20. The portable lighting device of claim 19, wherein the input port, the first outlet port, the second outlet port, and the third outlet port are evenly spaced about a circumference of the body.

21. A portable lighting device comprising:

a body having an input port, a first output port, and a second output port, the first input port operable to receive power from a power source, the first output port electrically coupled to the input port and configured to connect to a second portable lighting device by a first power cord, the second output port electrically coupled to the input port and configured to connect to a third portable lighting device by a second power cord;

a support member coupled to the body, the support member configured to hang the portable lighting device from a support structure;

a lighting unit extending downwardly from the body, the lighting unit electrically coupled to the input port to receive power from the power source; and a first wireless communication device supported by the body and an external device including a second wireless communication device, and wherein the first wireless communication device is operable to receive a signal from the external device to control the lighting unit.

22. The portable lighting device of claim 21, wherein the lighting unit includes a light emitting diode.

23. The portable lighting device of claim 21, wherein the support member is a hanging cable.

24. The portable lighting device of claim 21, wherein the body includes a third output port, the third output port electrically coupled to the input port and configured to connect to a third portable lighting device by a third power cord.

25. The portable lighting device of claim 24, wherein the input port, the first outlet port, the second outlet port, and the third outlet port are evenly spaced about a circumference of the body.

* * * * *